US006351590B1

(12) United States Patent
Shahid

(10) Patent No.: US 6,351,590 B1
(45) Date of Patent: Feb. 26, 2002

(54) OPTICAL HARNESS WITH OPTICAL CONNECTOR AND CROSS-CONNECT METHOD

(75) Inventor: Muhammed A. Shahid, Snellville, GA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/500,779

(22) Filed: Feb. 8, 2000

Related U.S. Application Data

(63) Continuation-in-part of application No. 09/343,967, filed on Jun. 30, 1999.

(51) Int. Cl.$^7$ .................................................. G02B 6/00
(52) U.S. Cl. ......................... 385/134; 385/53; 385/55; 385/134; 385/114; 385/136; 385/137
(58) Field of Search ............................... 385/53, 54, 55, 385/114, 115, 134, 135, 136, 137, 147

(56) References Cited

U.S. PATENT DOCUMENTS

| 5,134,673 | A | * | 7/1992 | Stephenson et al. ............ 385/56 |
| 5,155,785 | A | * | 10/1992 | Holland et al. ................. 385/89 |
| 5,222,179 | A | * | 6/1993 | Auteri .......................... 385/114 |
| 5,239,609 | A | * | 8/1993 | Auteri .......................... 385/136 |
| 5,367,595 | A | * | 11/1994 | Jennings et al. ................ 385/71 |
| 5,381,501 | A | * | 1/1995 | Cardinal et al. ................ 385/54 |
| 5,394,502 | A | * | 2/1995 | Caron ........................... 385/134 |
| 5,734,777 | A | * | 3/1998 | Merriken et al. ............... 385/135 |
| 5,926,598 | A | * | 7/1999 | Klein ........................... 385/137 |
| 6,034,821 | A | * | 3/2000 | Schenfeld et al. .............. 359/618 |
| 6,222,976 | B1 | * | 4/2001 | Shahid .......................... 385/134 |

* cited by examiner

Primary Examiner—Brian Healy
(74) Attorney, Agent, or Firm—Thomas, Kayden, Horstemeyer & Risley, LLP

(57) ABSTRACT

The present invention is an optical harness and method for an optical cross-connect. The optical harness is defined primarily by a first portion and a second portion. The first portion of the optical harness comprises a number M of fiber optic row cables where each fiber optic row cable comprises an array of a number N of fiber optics arranged on a first plane. The first plane on which each fiber optic row cable is disposed is substantially parallel to each of the other first planes on which a fiber optic row cable is disposed. The second portion of the optical harness comprises a number N of fiber optic column cables where each fiber optic column cable comprises an array of a number M of fiber optics arranged on a second plane. Each fiber optic column cable is disposed on a second plane being substantially parallel to each of the other second planes on which each other fiber optic column cable is disposed. The optical harness further comprises a holding mechanism disposed intermediate the first portion and the second portion of the optical harness. The orientation of the first planes on which the fiber optic row cables are disposed is arranged at a defined angle relative to the second plane on which the fiber optic column cables are disposed. The holding mechanism is arranged and configured to transition the fibers from one configuration toward the first portion to the second configuration toward the second portion and to prevent the separation of the fibers from the optical fiber row cables from progressing toward the first portion of the optical harness.

15 Claims, 9 Drawing Sheets

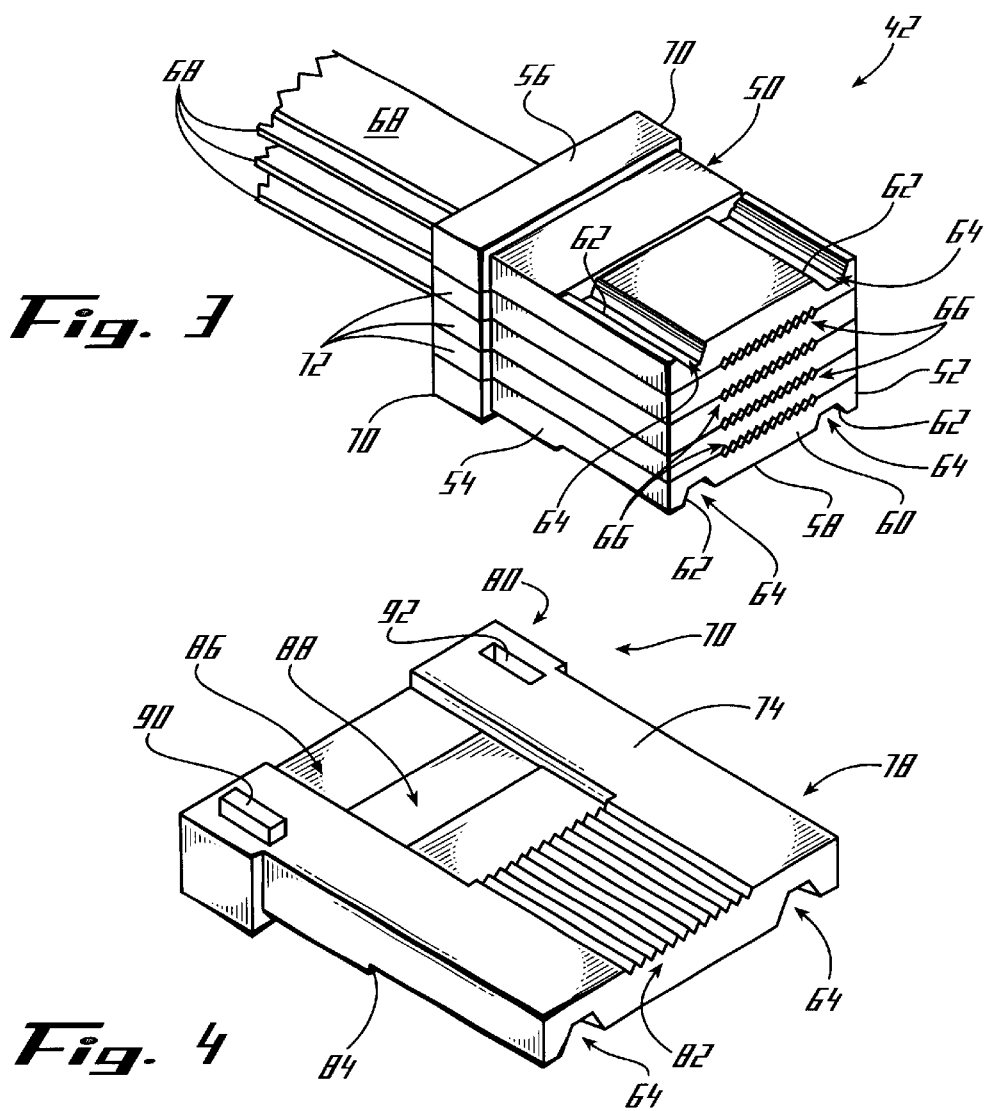
*Fig. 3*
*Fig. 4*
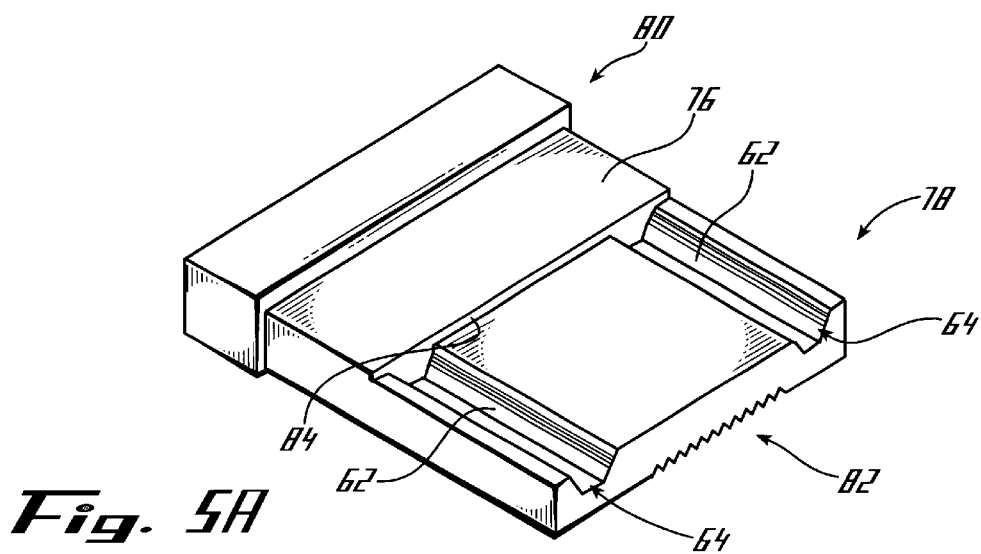
*Fig. 5A*

OPTICAL HARNESS WITH OPTICAL CONNECTOR AND CROSS-CONNECT METHOD

CROSS-REFERENCE TO RELATED APPLICATIONS

This application is a continuation-in-part of copending U.S. utility application entitled, "Optical Harness and Cross-Connect Method," having Ser. No. 09/343,967, filed Jun. 30, 1999, which is entirely incorporated herein by reference.

BACKGROUND OF THE INVENTION

Advances in light wave technology have made optical fibers a very popular medium for large bandwidth communication applications. In particular, optical technology is being utilized more and more in broadband systems wherein communications between systems take place on high-speed optical channels. As this trend continues to gain more and more momentum, the need for efficient utilization of the precious real estate on circuit boards, racks/shelves, back planes, distribution cabinets, etc., is becoming ever increasingly important. In order to fulfill expectations across the industry, opto-electronic modules and optic fiber devices need to continue to be made miniaturized or compact, thereby taking full advantage of the maturity of micro- and opto-electronic technologies for generating, transporting, managing and delivering broadband services to ever increasing bandwidth demands of end users at increasingly lower costs. Thus, the industry has placed an emphasis on small optical connectors and optical harnesses, both simple and complex. However, miniaturizing and compacting is tempered by the requirements of transmission efficiency and organization.

With the miniaturization of optical modules and optical fiber devices, the management of optical fiber congestion has become an issue at optical interfaces and connection distribution points. One solution is the use of multi-fiber ribbon in which a plurality of optical fibers are organized and contained side by side in a plastic ribbon. It is known to interconnect these ribbon cables by supporting the fibers between two support members made of a monocrystaline material, such as silicon. In the support members are V-grooves formed utilizing photolithographic masking and etching techniques. The fibers are placed side by side in individual V-grooves of one support member. The other mating support member, having corresponding V-grooves, is placed over the fibers so as to bind or hold the fibers in a high precision spatial relationship between the mating V-grooves. The top and bottom support members sandwiching the multi-fiber ribbon are typically bonded together with a clamp or adhesive, forming a plug of a multi-fiber connector. Two mating plugs with the same fiber spacing may then be placed in an abutting relationship so that the ends of the fibers of the respective plugs are substantially co-axially aligned with one another, thereby forming a multi-fiber connection. If desired, such plugs can be stacked in order to increase the interconnection density. However, in addition to straight connections, in some applications it is desirable to re-route the optical fibers in a multi-fiber ribbon and reconfigure the optical fibers in a new multi-fiber ribbon combination.

Multi-fiber ribbons and connectors have numerous applications in optic communication systems. For instance, optical switches, optical power splitters/combiners, routers, etc., have several input and/or output ports arranged as linear arrays to which a plurality of fibers are to be coupled. Further, since optical fibers are attached somehow to launch optical signals into these devices and extract optical signals therefrom, splicing of arrays of fibers (i.e., a multi-fiber ribbon) to such devices can be achieved using multi-fiber connectors. Another possible application relates to an optical fan-out fabric where an array of fibers in a multi-fiber ribbon may be broken into simplex or duplex channels for distribution purposes, as is often desired.

Yet another multiple fiber application is the perfect shuffle cross-connect, where, for example, each of the multiple input ports, typically comprising more than one optical fiber, is in communication by one fiber with each of the multiple output ports, which also typically comprises more than one optical fiber. The perfect shuffle cross-connect provides for multi-channel optical transmissions, for example as in multi-wavelength transmissions, to be mixed and re-routed in an orderly fashion. Currently, such connections are made by flexible optical circuits or complex jumpers. While complex jumpers take up space and create congestion, the flexible optical circuit is expensive to produce, often requiring highly skilled labor, such as a CAD designer to generate the original drawings of the circuit, and expensive processing machines such as those for fiber routing, lamination and connectorization equipment.

With the development of downsized optical modules and optical fiber devices comes the necessity and challenge of developing connectors for use with such devices.

In summary, there continues to be strong market forces driving the development of fiber optic connection systems that take up less space and relieve congestion, while at the same time demanding that the increasing interconnection density requirements be satisfied. Further, such a connection system should be capable of being manufactured and assembled easily and inexpensively.

Thus, a heretofore-unaddressed need exists in the industry to address the aforementioned deficiencies and inadequacies.

SUMMARY OF THE INVENTION

The present invention is an optical harness for an optical cross-connect defined primarily by a first portion and a second portion. The first portion of the optical harness comprises a number M of fiber optic row cables where each fiber optic row cable comprises an array of a number N of fibers arranged on a first plane. The first plane on which each fiber optic row cable is disposed is substantially parallel to each other first plane on which a fiber optic row cable is disposed. The second portion of the optical harness comprises a number N of fiber optic column cables where each fiber optic column cable comprises an array of a number M of fibers arranged on a second plane angularly disposed relative to the first plane. The second plane on which each fiber optic column cable is disposed is substantially parallel to each other second plane on which a fiber optic column cable is disposed. The optical harness further comprises a holding mechanism disposed intermediate the first portion and the second portion of the optical harness. The orientation of the first planes on which the fiber optic row cables are disposed is arranged at a defined angle relative to the second planes on which the fiber optic column cables are disposed. The holding mechanism is arranged and configured to transition the fibers from one configuration toward the first portion to the other configuration toward the second portion and to maintain the relative angled arrangement.

The present invention is also a high-density plug-like optical connector having outer support members and an inner support members, both having an array of substantially parallel grooves for receiving fibers. The outer support members and the inner support members can be stacked to received a plurality of optical fibers in a variety of arrangements.

The present invention can also be viewed as a method for providing an optical cross-connect between a first element and a second element between which distribution or re-routing accurately positioned optical fibers in predetermined configuration is desired. In this regard, the method can be broadly summarized by the following steps: providing a number M of fiber optic row cables having a defined length, where each fiber optic row cable comprises an array of a number N of fibers arranged on a first plane substantially parallel to the first plane of each of the other fiber optic row cables; stacking the number M of fiber optic row cables; disposing a holding mechanism intermediate the defined length of the fiber optic row cables; separating each array of N fibers into individual fibers; re-grouping the fiber optics into a number N of fiber optic column cables, each comprising a number M of fibers; connecting the first portion of the crossconnect to the first element; and connecting the second portion of the cross-connect to the second element. Thus a transition from a plurality, such as twelve, rows of, for example, ten fibers each, to an array of ten columns of twelve fibers each is realized. Each column contains only the fibers, which have common positions in the rows. Thus all number one fibers are in one column, number two fibers in a second column, etc. This makes possible a perfect shuffle cross-connect in a minimum of space and complexity.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a perspective view of a plug-like optical connector, which is in the form of a stack of multi-fiber connectors terminating several optical fiber ribbons, in accordance with an embodiment of the present invention.

FIG. 4 is an isolated perspective view of an inside surface of an outer support member of the stack of multi-fiber connectors of FIG. 3.

FIG. 5A is an isolated perspective view of an outside surface of the outer support member of FIG. 4.

DETAILED DESCRIPTION OF THE INVENTION

Figure 1:
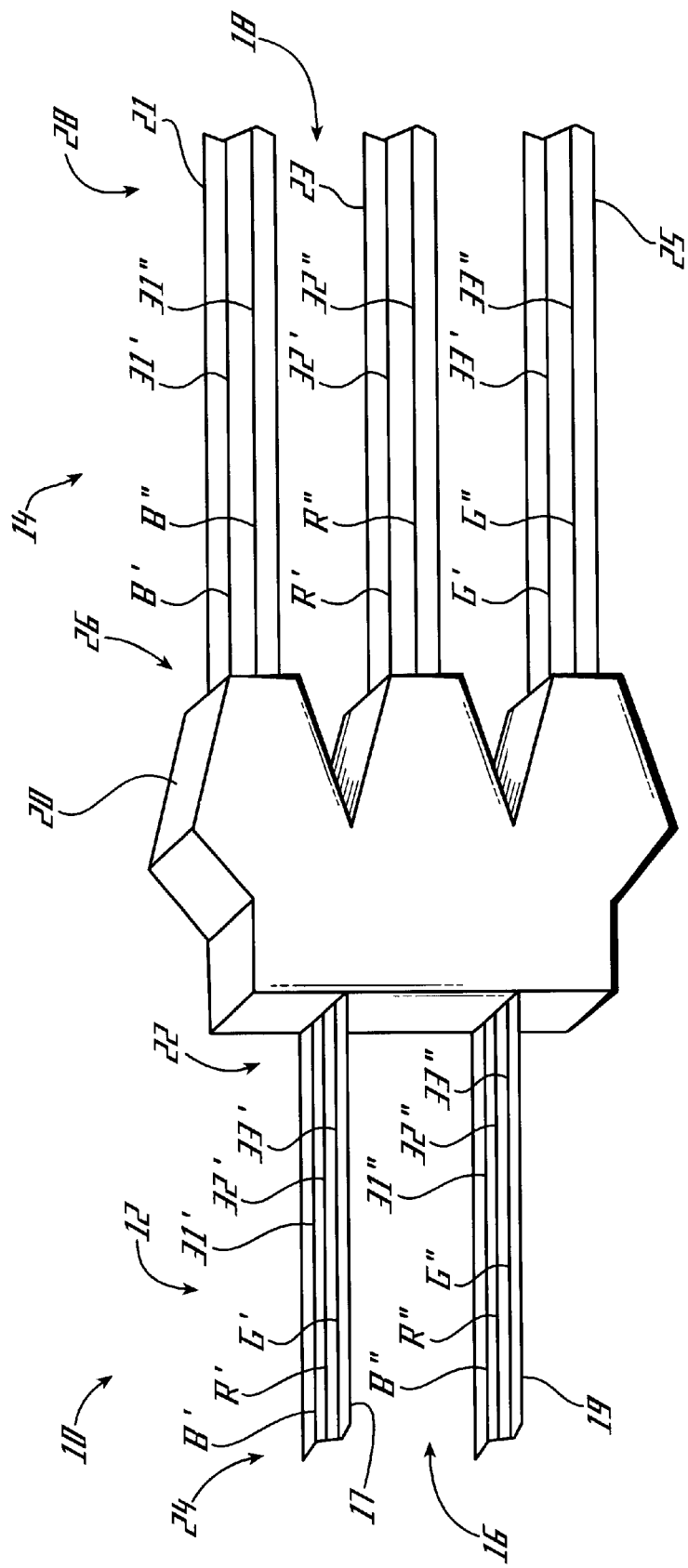
FIG. 1 illustrates a perspective view of an embodiment of the optical harness of the present invention.
Figure 2:
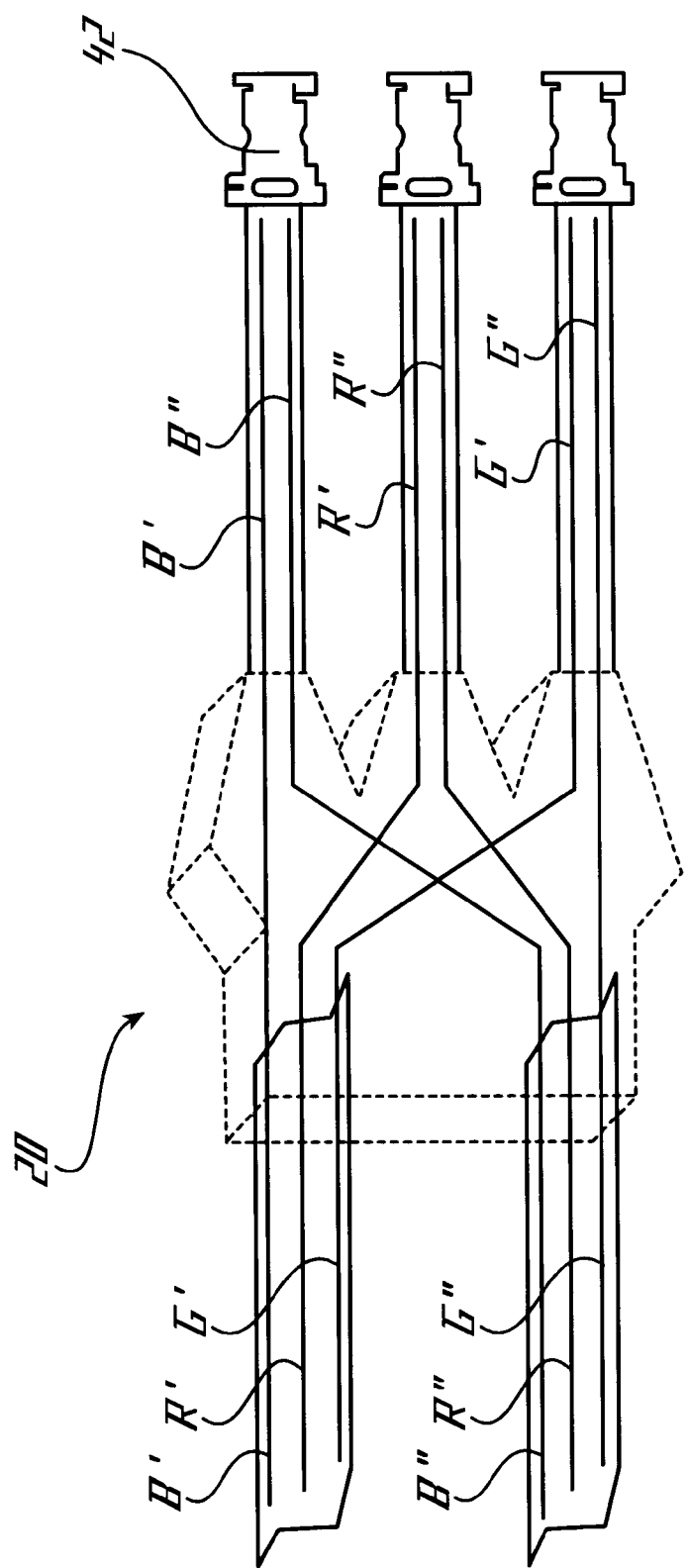
FIG. 2 illustrates a perspective view showing a cut-away view of a holding mechanism of the optical harness of FIG. 1.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modification, equivalents, and alternatives falling within the spirit and scope of the invention as defined by the claims.

FIG. 1 illustrates a preferred embodiment of an optical harness of the present invention, identified generally by reference numeral 10. The optical harness 10 of the present invention provides an optical cross-connect capable of receiving multiple wavelengths and separating or mixing the wavelengths with accurately positioned optical fibers in a pre-designed configuration. Broadly, the optical harness 10 transitions rows of a plurality of fibers 17, 19, disposed toward a first portion 12 of the optical harness 10, to a plurality of columns of fibers 21, 23, 25, disposed toward a second portion 14 of the harness 10, where the fibers have conmnon positions in the rows.

For receiving and re-routing M number of wavelengths, generally, the present invention embodies an optical harness 10 having a number M of fiber optic row cables 16 disposed toward a first portion 12 of an optical harness 10 and a number N of fiber optic column cables 18 disposed toward a second portion 14 of an optical harness 10. Each of the M number of fiber optic row cables 16 comprises an array comprising a number N of optical fibers arranged on a first plane that is substantially parallel to the first plane of each of the other M number of fiber optic row cables 16. It is preferable that each of the fiber optic row cables 16 is ribbonized, such as the type taught in U.S. Pat. No. 4,900,126, the disclosure of which is herein incorporated by reference. Each of the N number of optical fibers is separated from its ribbonized configuration, re-routed, and configured such that each of the number N of fiber optic column cables 18 comprises an array of a number M of fibers. Each of the number M of fibers are arranged on a second plane substantially parallel to the second planes on which each of the other number N of fiber optic column cables 18 are arranged.

To re-rout the multiple wavelengths in a predetermined accurate configuration, or provide a perfect shuffle optical cross-connect, each optical fiber in the array of the N number of optical fibers comprising each fiber optic row cable 16 is re-routed to a different cable of the N number of fiber optic column cables 18. A holding and routing mechanism 20 is disposed intermediate first portion 12 and second portion 14 of the optical harness 10 and arranged and configured to maintain the fiber optic row cables 16 in the preferred first plane orientation and the fiber optic column cables 18 in the preferred second plane orientation. The optical fibers of the fiber optic column cables 18 can then be re-ribbonized in their new configuration. To provide a perfect shuffle cross-connect, the fiber optics are re-routed in an organized manner. For example, the optical fibers in a first position in each of the fiber optic row cables 16 can be re-routed to a first fiber optic column cable 18 and arranged "in order" such that the fiber re-routed from the first position fiber optic row cable 16 is positioned as the first position fiber in the first position fiber optic column cable 18 and the fiber re-routed from the second position fiber optic row cable 16 is positioned as the second position fiber in the first position fiber optic column cable 18, and so on. To assist in ensuring such organization, the fibers can be coded, or marked, such as with color or by any other suitable means, to indicate their location in each fiber optic row cable 16 (the fiber's position in an array). The fibers can be further marked to indicate from which fiber optic row cable 16 the fiber originated.

Looking first at the first portion 12 of the harness 10, the first position fiber optic row cable 17 comprises an array of fibers that includes a first position fiber 31', preferably colored and marked, such as with the color blue B', a second position fiber 32', preferably colored and marked, such as with the color red R', and a third position fiber 33', preferably colored and marked, such as with the color green G', arranged on a first plane. Similarly, the second position fiber optic row cable 19 comprises a first position fiber 31", preferably colored and marked, such as with the color blue B", a second position fiber 32", preferably colored and marked, such as with the color red R", and a third position fiber 33", preferably colored and marked, such as with the color green G", arranged on a first plane.

Although two fiber optic row cables 17 and 19 comprising three fibers each are illustrated, it should be understood that the present invention can include any number of fiber optic row cables, each comprising any number of fibers. The first position fiber optic row cable 17 and second position fiber optic row cable 19 are preferably ribbonized and collected by a holding mechanism 20. It is preferable that the first plane of the first fiber optic row cable 17 and the first plane of the second fiber optic row cable 19 are substantially parallel to each other. In this stacked configuration, the fibers preferably are arranged in columns of like colors. The fiber optics comprising the fiber optic row cables are separated from their respective originating fiber optic row cables 17, 19, and re-grouped and preferably re-ribbonized, into columns comprising fibers of corresponding orientation within their respective fiber optic row cables, or those having similar marks or coloring. The columns comprising fibers of like markings comprise the fiber optic column cables disposed toward the second portion 14 of the optical harness 10.

The holding mechanism 20 holds the stack of fiber optic row cables in position and prevents the point of separation of the fibers out of the fiber optic row cable configuration from extending further along the fiber optic row cables in a direction away from the holding mechanism 20. The re-configured fibers extend from the holding mechanism 20 and are grouped in a first position fiber optic column cable 21, a second position fiber optic column cable 23 and a third position fiber optic column cable 25. The first position fiber optic column cable 21 preferably comprises the first position fiber 31', from the first position fiber optic row cable 17, preferably colored and marked, such as with the color blue B', and the first position fiber optic 31" from the second position fiber optic row cable 19, preferably colored and marked, such as with the color blue B", arranged on a second plane. Similarly, the second position fiber optic column cable 23 comprises the second position fiber optic 32', preferably colored and marked, such as with the color red R', and the second position fiber optic 32" from the first position fiber optic row cable 17, preferably colored and marked, such as with the color red R", arranged on a second plane. Finally, the third position fiber optic column cable 25 comprises the third position fiber optic 33' from the first position fiber optic row cable 17, preferably colored and marked, such as with the color green G', and the third position fiber optic 33" from the second position fiber optic row cable 19, is preferably colored and marked, such as with the color green G", arranged on a second plane.

It should be noted that the first position for each of the fiber optic column cables, the first position optic fiber 31', 32' and 33', marked B', R' and G' respectively, originate from the first position fiber optic row cable 17. Similarly, the second position fiber optics 31", 32" and 33", marked B", R", and G", respectively, are in the second position of each of the fiber optic column cables. As such, each fiber optic row cable 17, 19 is in communication with each fiber optic column cable 21, 23, 25 by one fiber optic. This method of reconfiguration provides for the perfect shuffle cross-connect. As discussed previously, marking each fiber optic to indicate its location at the first portion 12 of the optical harness 10 can assist in such an organized re-routing.

Each of the fiber optic row cables 17, 19 are preferably arranged and held on a first plane by the holding mechanism 20, each first plane being substantially parallel to the others. Likewise, each of the fiber optic column cables 21, 23, 25 is preferably arranged and held on a second plane by the holding mechanism 20, each second plane being substantially parallel to the others. The first planes on which the fiber optic row cables are arranged are preferably oriented at a defined angle relative to the second planes on which the fiber optic column cables are arranged. The defined angle preferably is substantially ninety degrees. To provide a perfect shuffle cross-connect communication, opposing free ends of the fiber optic row cables and fiber optic column cables, respectively, each preferably includes a connector 42. Although it should be understood that any connector capable of providing the desired communication can be used, one preferred connector 42 is a plug-like high-density optical connector 50 formed from stackable multi-fiber connectors. FIGS. 3–15 illustrate this preferred connector.

FIG. 3 illustrates the preferred plug-like optical connector 50 as described in U.S. pat. application having the Ser. No. 09/416,185, filed on Oct. 11, 1999, which is herein fully incorporated by reference. As illustrated, the optical connector 50 includes opposite right and left sides 52, 54 that extend vertically and in a longitudinal direction. The optical connector 50 further includes opposite top and bottom sides 56, 58 that extend in the longitudinal direction and horizontally between the right and left sides 52, 54. An optical end face 60 extends generally perpendicular to the longitudinal direction and between forward edges of the right, left, top, and bottom sides 52, 54, 56, 58. More specifically, the optical end face 60 includes right, left, top, and bottom edges that are respectively contiguous with the forward edges of the right, left, top, and bottom sides 52, 54, 56, 58.

With respect to the detailed description of the plug-like optical connector, items are described in the context of specific orientations, such as horizontal and vertical orientations. Those orientations are intended to provide a frame of reference to aid in the explanation of the present invention. The connector of the present invention can be described in the context of other orientations and is not limited to any specific orientation.

In accordance with one embodiment of the present invention, the optical connector 50 includes a pair of upper alignment members and a pair of lower alignment members that are operative, as will be discussed in greater detail below, for aligning the optical end face 60 of the optical connector with an optical end face of another optical connector. The alignment members may be dowels or pins, or the like, associated with a first connector, and correspondingly shaped apertures, or the like, associated with a second connector that is capable of mating with the first connector. However, in accordance with the first embodiment, the pair of upper alignment members includes a pair of alignment surfaces 62 that are located at the top side 56 of the optical connector 50 and define a pair of alignment grooves 64 that extend in the longitudinal direction along the top side of the optical connector 50. Likewise, the pair of lower alignment members includes a pair of alignment surfaces 62 that are located on the bottom side 58 of the optical connector 50 and define a pair of alignment grooves 64 that extend in the longitudinal direction along the bottom side of the optical connector 50. In accordance with this embodiment, the alignment grooves 64 at the top side 56 are open at the optical end face 60 as well as along the top side. Similarly, the alignment grooves 64 at the bottom side 58 are open at the optical end face 60 as well as along the bottom side 58. In accordance with one embodiment, the alignment grooves 64 are in the form of truncated V-shapes.

In accordance with this embodiment of the connector, four separate arrays 66 of optical terminuses extend horizontally along the optical end face 60. It is within the scope of the connector of the present invention for the optical terminuses of the arrays 66 to be a variety of different types of optical devices. Examples of optical terminuses that are within the scope of the present invention include, but are not limited to, terminuses of optical fibers, optical transmitters, and optical receivers. Optical transmitters can be light emitting diodes, VCSELS, or the like. Optical receivers can be photoelectric cells, or the like. In accordance with this embodiment, in each array 66, a distance is defined between adjacent optical terminuses, and that distance is less than the distance defined between adjacent arrays.

In accordance with this embodiment, the optical connector 50 is a stack of multi-fiber connectors and the optical terminuses of the arrays 66 are the terminuses of optical fibers of four optical fiber ribbons 68. Optical fiber ribbons 68 illustrated in FIG. 3 can comprise either the fiber optic row cables 16, the fiber optic column cables 18, or fiber ribbons to which ribbons comprising the harness 10 can be connected as disclosed herein. It should also be noted that although the connector illustrated herein comprises optical terminuses for four optical fiber ribbons 68, the connector of the present invention can comprise optical terminuses for any number of fiber ribbons. Generally, each optical fiber ribbon 68 to be used with this preferred connector extends longitudinally and includes a lateral array of conventional coated optical fibers that transmit light. It is preferred that optical fiber ribbon 68 further includes a solidified bonding material that fills the interstices between the optical fibers, binds together the optical fibers, and extends to the outside boundary of the optical fiber ribbon 68.

The optical connector 50 may include two identical outer support members 70 that sandwich three identical inner support members 72. For illustrative purposes, the connector 50 is shown as terminating four optical fiber ribbons 68. It will be apparent to those skilled in the art that the disclosed connector design may be utilized to terminate any number of optical fiber ribbons 68 and/or any number of optical fibers per optical fiber ribbon.

As will be discussed in greater detail below, the support members 70, 72 include parallel V-grooves that hold the optical fibers of the respective optical fiber ribbons 68 in precise, spaced alignment with respect to one another as the V-grooves of adjacent support members are laid over one another in a mating relationship. The terminuses of the individual optical fibers of the optical fiber ribbons 68 are substantially flush to the optical end face 60 of the optical connector 50 so that the optical fibers may be optically coupled to another connector or device, such as optical transmitter and receiver modules.

With reference to FIGS. 4 and 5A, an inside surface 74 and an outside surface 76 of a representative outer support member 70 are illustrated, respectively, in accordance with one embodiment. The outer support member 70 includes a front portion 78 and a rear portion 80. As best seen in FIG. 4, an array of parallel V-grooves 82 for receiving and holding the optical fibers of an optical fiber ribbon 68 (FIG. 3) in precise alignment with respect to one another are provided in the front portion 78 of the inside surface 74. Although twelve V-grooves 82 are provided by the outer support member 70, it will be appreciated by those of ordinary skill in the art that more or fewer than twelve may be utilized. However, the maximum number may be limited by the physical size of the connector footprint.

As best seen in FIG. 5A, the outside surface 76 includes a pair of the relatively large alignment grooves 64 (also see FIG. 3), which are laterally displaced from one another and are sized and shaped for holding alignment ridges, which are discussed below in detail. Although the alignment grooves 64 extend from the front portion 78 toward the rear portion 80 and terminate at a shoulder 86, the alignment grooves can be sized to extend from the front portion 78 to the opposite rear edge of the outside surface 76.

Figure 5B:
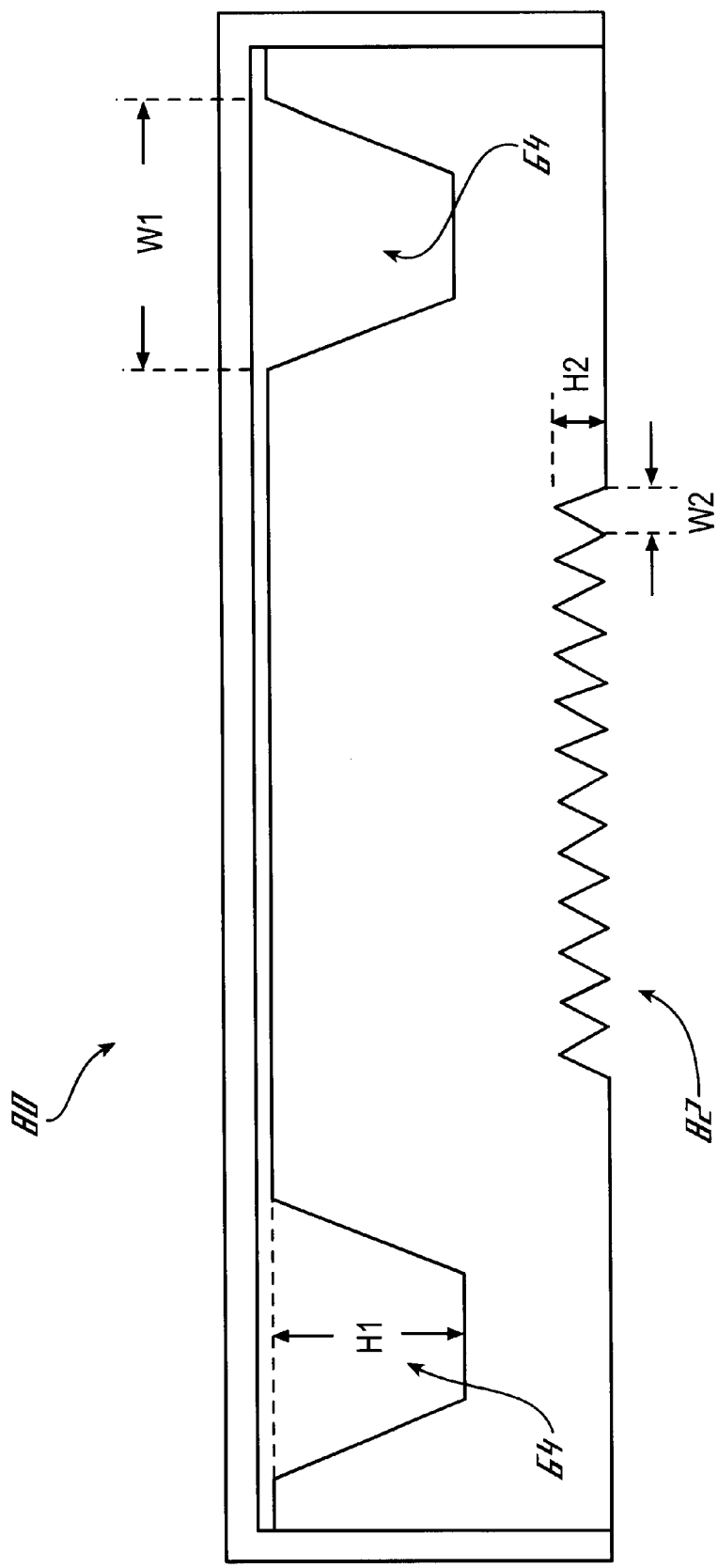
FIG. 5B is an isolated end elevation view of the outer support member of FIG. 4.

As best seen in FIG. 5B, in accordance with this embodiment, the alignment grooves 64 are substantially larger than the individual grooves of the array of parallel V-grooves 82. More specifically, each of the alignment grooves 64 has a width "W1" and a height "H1" that are respectively at least twice as large as a corresponding width "W2" and height "H2" of each of the individual grooves of the array of parallel V-grooves 82. In accordance with this embodiment, each of the alignment grooves 64 has a width W1 of approximately 850 microns and a height H2 of approximately 375 to 400 microns, and each of the individual grooves of the array of parallel V-grooves 82 has a width W2 of approximately 150 microns and a height HI of approximately 80 to 90 microns. In addition, the alignment grooves are substantially larger in diameter than the diameter of the optical fibers received by the V-grooves 82.

In accordance with this embodiment, each of the optical fibers can include a glass center that is surrounded by a coating, and the outer diameter of the coating is approximately 250 microns. For each of the optical fibers, the coating is stripped from the glass center and the glass center only is placed in the respective V-groove 82. Each glass center has a diameter of approximately 125 microns. The alignment grooves 64 are relatively large so that they are relatively strong, and relatively easy to manufacture and use. In addition, adjacent alignment grooves 64 are further apart than adjacent grooves of the array of parallel V-grooves 82, which further promotes ease of use.

Referring again to FIG. 4, the rear portion 80 includes a ribbon recess 86 that holds an optical fiber ribbon 68 (FIG. 3) at approximately the point at which the individual optical fibers of the ribbon are separated and stripped. The ribbon recess 86 also provides space for the adhesive utilized to bond adjacent support members together, as discussed below. Further, the ribbon recess 86 includes a strain relief element recess 88 for receiving and engaging a lip or other retaining structure at the end of an external strain relief element (not shown) associated with the optical fiber ribbon 68.

A retaining pin 90 and a retaining slot 92 are provided on either side of the ribbon recess 86 for aligning and holding adjacent support members. The retaining pin 90 and slot 92 provide for the lateral alignment of adjacent support members so that corresponding arrays of V-grooves align with one another. The mating V-grooves can be fabricated with such precision, as discussed hereinafter, that the V-grooves themselves precisely align the individual optical fibers. This is inherent in the V-shaped design, which has an acceptance region for receiving an individual optical fiber. The optical fiber is held in a precise predetermined alignment by the sides of the V-groove. The precise alignment of adjacent support members ensures that the mating V-grooves of adjacent support members are in registration with one another.

Figure 6:
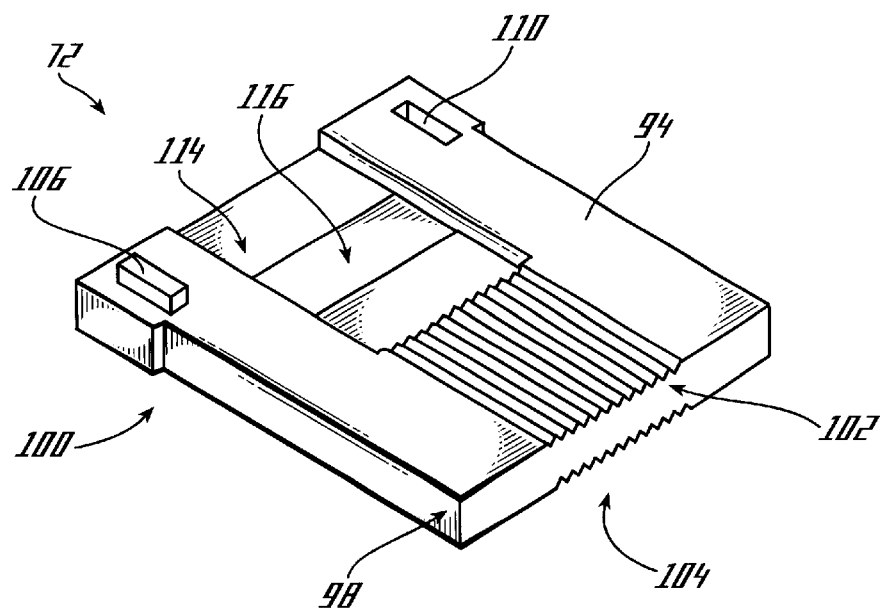
FIG. 6 is an isolated perspective view of a first surface of an inner support member of the stack of multi-fiber connectors of FIG. 3.
Figure 7:
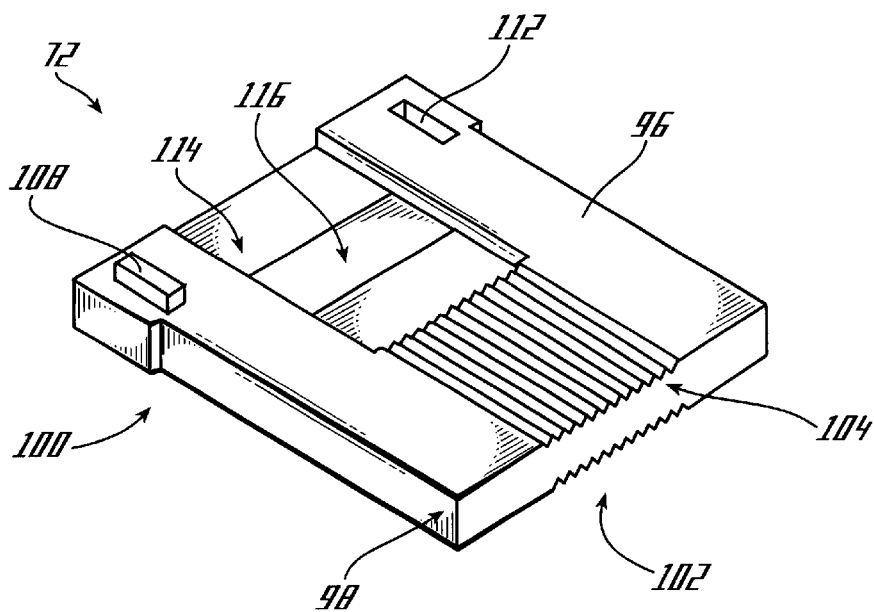
FIG. 7 is an isolated perspective view of a second surface of the inner support member of FIG. 6.

With reference to FIGS. 6 and 7, opposing surfaces 94, 96 of a representative inner support member 72 are respectively illustrated in accordance with the first embodiment. The inner support member 72 includes a front portion 98 and a rear portion 100. As best seen in FIG. 6, a first array of parallel fiber-receiving V-grooves 102 are provided in the surface 94 at the front portion 98 for receiving and holding optical fibers of an optical fiber ribbon 68 (FIG. 3). In addition, and as best seen in FIG. 7, the surface 96 of the inner support member 72 includes a second array of parallel fiber receiving V-grooves 104 for receiving and holding optical fibers of an optical fiber ribbon 68. Thus, the inner support member 72 includes substantially identical and aligned arrays of V-grooves 102, 104 on opposite surfaces for mating with corresponding arrays of V-grooves formed in adjacent support members. The arrays of V-grooves 102, 104 are sized like the array of V-grooves 82 (FIGS. 4 and 5A). Retaining pins 106, 108 and retaining slots 110, 112 are provided on the surfaces 94, 96 at the rear portion 100 of the inner support member 72 for aligning and holding adjacent support members, as discussed above with respect to the outer support member 70 (FIGS. 3–5A). A ribbon recess 114 and a strain relief element recess 116 are provided in both surfaces 94, 96, as also discussed above with respect to the outer support member 70.

In accordance with this embodiment, the inner support member 72 does not include alignment grooves 64 (FIGS. 3–5B), or the like. In addition, as illustrated in FIG. 4, the inside surfaces 74 of the outer support members 70 do not include alignment grooves 64, or the like. Accordingly, as best seen in FIGS. 4, 6 and 7, ample lateral space is available for the illustrated V-grooves 82, 102, 104, and sufficient free lateral space is available for enabling the further increase of interconnection density. In addition, because the inner support members 72 do not include alignment grooves 64, or the like, the thickness of the inner support members 72 may be less than that of conventional support members since the inner support members 72 do not have to be thick enough to accommodate alignment grooves, or the like. Accordingly, by reducing the thickness of the inner support members 72, a stackable multi-fiber connector can be made small enough to be received within a smaller connector housing, thereby enabling a further increase of interconnection density.

Referring again to FIG. 3, the optical connector 50 may terminate any number of optical fiber ribbons 68 by utilizing two outer support members 70 and an appropriate number of inner support members 72. As only the two types of structural component need to be manufactured, the overall costs of a stackable multi-fiber connector in accordance with the present invention can be less than that of comparable stackable connectors that require more than two types of components. This is, at least in part, because the support members can be fabricated using plastic injection molding techniques with only two molds: one for the outer support member 70 and one for the inner support member 72. This further increases the precision of the V-grooves because adjacent parts may be formed from the same mold.

The support members 70, 72 are preferably fabricated using the techniques described in U.S. Pat. Nos. 5,388,174; 5,620,634 and 5,603,870, each of which is incorporated herein by reference. This process has been proven to consistently and reliably produce features with accuracy on the order of 1 $\mu$m or better. Generally, an example of this process is as follows. Initially, a monocrystalline body, such as a silicon chip, is anisotropically etched using conventional masking and etching techniques to produce grooves corresponding to grooves selected from the V-grooves 82, 102, 104 (FIGS. SA, 6, 7) and alignment grooves 64 (FIGS. 3–5B). For example, either KOH/water or EDP/water solutions may be used as an etchant. The etch rate of the silicon may be several orders of magnitude greater than that of the mask layer such that the unmasked portions are etched away when exposed to the etchant solution, thereby defining the grooves along the {111} crystal planes of the silicon. By precisely controlling the mask pattern and the etching process, precise grooves of predetermined spacing, widths, and depths may be fabricated in the silicon wafer.

To allow for shrinkage of the plastic during the subsequent molding process, the features on the silicon chip, such as the grooves and their spacing, should be made somewhat larger than is finally intended for the final support member. A metal layer is then electro-formed over the grooves thereafter, the silicon body is removed or destroyed, as by etching it in, for example, a mixture of HF, $HNO_3$ and water, or KOH and water (or other known etchants of silicon) suitable for use herein. In the preferred embodiment, the metal layer is formed by electroforming nickel over the silicon wafer. Nickel is preferred because it can be conveniently electro-formed with reasonable hardness (e.g., ~50 Rockwell). The electro-formed metal layer forms an inverse replica of the silicon wafer chip which is machined for used as an insert in an injection mold for defining features of one of the support members 70, 72.

Experiments may be conducted with the injection mold to optimize molding conditions. This involves selection of the most suitable molding compound, molding parameters that produce a smooth surface morphology, and most importantly the degree of mold shrinkage. Such experiments help determine the operation parameters for the optimal output. The preferred material for forming the support members 70, 72 is polyphenylene sulfide (PPS), which has a shrinkage of ~0.4% below the dimensions of the original silicon master. Consequently, the dimensions of the silicon master should be ~0.4% greater than the final desired dimensions. For bonding the support members 70, 72 together, any of various optical adhesives can be used, such as Epo-Tek 353ND, which is commercially available from Epoxy Technologies, Inc., Billerica, Mass.

Multi-fiber connectors having some similarities to the ones described above are the subject matter of co-pending patent application Ser. No. 09/262,112, entitled "Stackable Multi-Fiber Ferrule Assembly Methods And Tools," application Ser. No. 091262,107, entitled "Stackable Multi-Fiber Ferrules Having Improved Interconnection Density," both filed Mar. 4, 1999, the disclosures of which are incorporated herein by reference.

Figure 8:
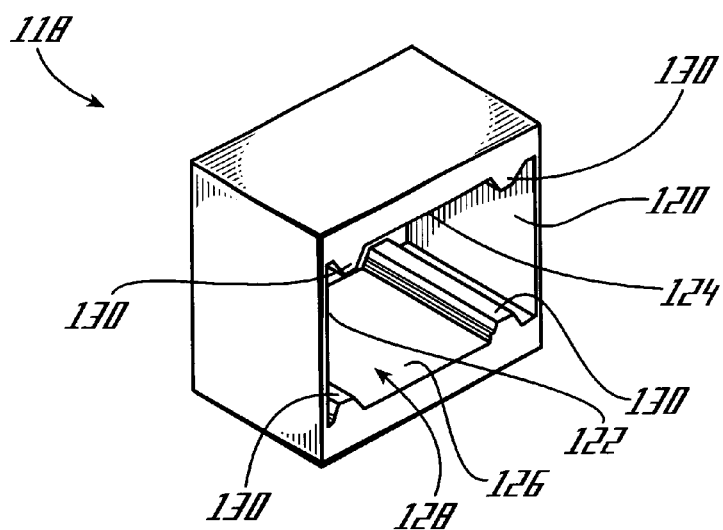
FIG. 8 is an isolated perspective view of an alignment receptacle in accordance with the first embodiment of the present invention.

FIG. 8 illustrates an alignment receptacle 118, in accordance with the first embodiment of the present invention. The alignment receptacle 118 includes opposite interior right and left sides 120, 122 that extend vertically and in a longitudinal direction. Opposite interior top and bottom sides 124, 126 extend horizontally between the right and left interior sides 120, 122 and in the longitudinal direction. The interior sides 120, 122, 124, 126 extend around and define a passage 128 that is open at the opposite ends of the alignment receptacle 118. In accordance with the first embodiment, each of the opposite openings to the passage 128 receive an optical end face 60 (FIG. 3) of a respective pluglike optical connector 50 (FIG. 3) so that those optical end faces can be readily mated together in an aligned manner, as will be discussed below in greater detail. The alignment receptacle 118 includes a pair of upper alignment members and a pair of lower alignment members that facilitate the alignment between the two oppositely oriented end faces 60 (FIG. 3) that are introduced into the opposite openings of the passage 128. It is within the scope of the present invention for alignment members to be dowels or pins, or the like, associated with a first connector or alignment receptacle, and correspondingly shaped apertures, or the like, associated with a second connector or alignment receptacle that is capable of mating with the first connector or alignment receptacle. More specifically, in accordance with this embodiment, the pair of upper alignment members is a pair of alignment ridges 130 that protrude from the interior top side 124 of the alignment receptacle 118 and extend in the longitudinal direction. Likewise, the pair of lower alignment members is a pair of alignment ridges 130 that protrude from the interior bottom side 126 of the alignment receptacle 118 and extend in the longitudinal direction. In accordance with the first embodiment, the aligrnent ridges 130 are in the form of truncated V-shapes having heights and widths that correspond approximately to the height H1 (FIG. 5B) and width W1 (FIG. 5B) of the alignment grooves 64 (FIGS. 3–5B). The alignment ridges 130 are relatively large so that they are relatively strong, and relatively easy to manufacture and use. The alignment receptacle 118 is preferably constructed using materials and techniques similar to those described above for the support members 70, 72 (FIGS. 3–7), except that ridges 130 are formed rather than grooves. In accordance with an alternative embodiment of the present invention, the alignment grooves 64 are more rounded, and the alignment ridges 130 define corresponding rounded shapes.

Figure 9:
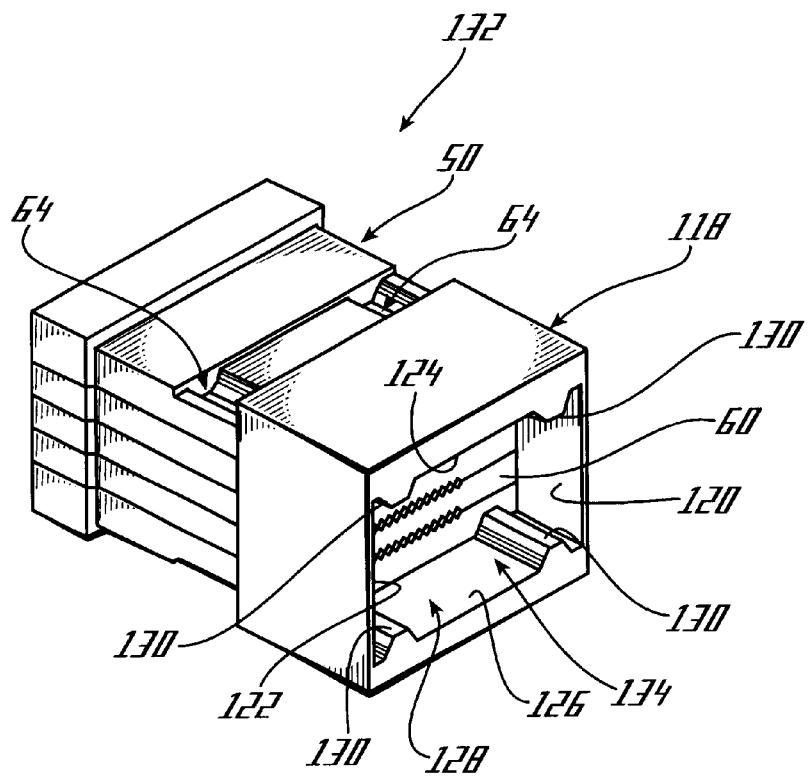
FIG. 9 is a perspective view of a receptacle-like optical connector, which is in the form of the plug-like optical connector of FIG. 3 mated to the alignment receptacle of FIG. 8, in accordance with an embodiment of the present invention.

FIG. 9 illustrates a plug-like optical connector 50 (also see FIG. 3) mated to an alignment receptacle 118 (also see FIG. 8) in accordance with the first embodiment of the connector of the present invention. The mating is facilitated by inserting the optical end face 60 of the optical connector 50 into an open end of the passage 128 with the alignment grooves 64 of the optical connector respectively aligned with the alignment ridges 130 of the alignment receptacle 118, so that the alignment ridges are received by the alignment grooves 118. As illustrated in FIG. 9, the combination of the optical connector 50 and the alignment receptacle 118 can be characterized as a receptacle-like optical connector 132.

In accordance with this embodiment, the receptacle-like optical connector 132 is arranged so that the pair of upper alignment ridges 130 extend in the longitudinal direction away from the upper edge of the optical end face 60. Further, the lower alignment ridges 130 extend in the longitudinal direction away from the bottom edge of the optical end face 60. In addition, the interior right side 120 of the alignment receptacle 118 extends in the longitudinal direction away from the right edge of the optical end face 60, the interior left side 122 of the alignment receptacle 118 extends in the longitudinal direction away from the left edge of the optical end face 60, the interior top side 124 of the alignment receptacle 118 extends in the longitudinal direction away from the top edge of the optical end face 60, and the interior bottom side 126 of the alignment receptacle 118 extends in the longitudinal direction away from the bottom edge of the optical end face 60. Accordingly, the receptacle-like optical connector 132 can be characterized as including a receptacle cavity 134 that is defined by the optical end face 60 and the interior sides 120, 122, 124, 126.

Figure 10:
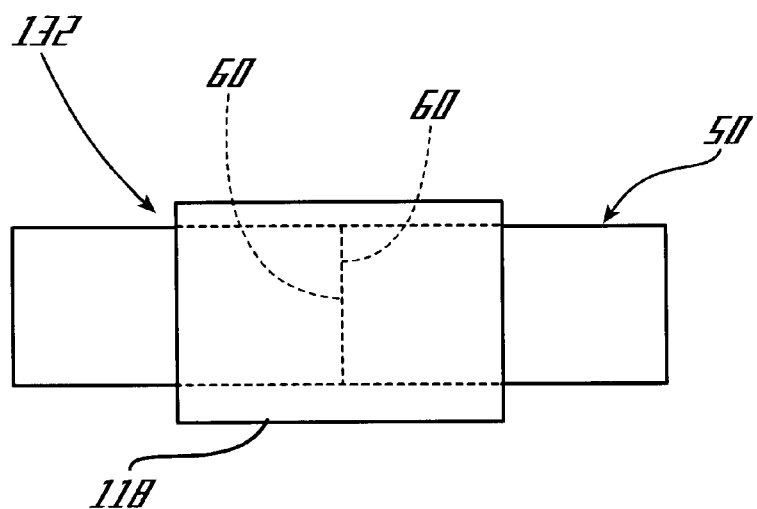
FIG. 10 is a schematic top plan view of the plug-like optical connector of FIG. 3 mated to the receptacle-like optical connector of FIG. 9, in accordance with the first embodiment of the present invention.

Referring to both FIGS. 3 and 9, the optical end face 60 of a plug-like optical connector 50 can be introduced into the receptacle cavity 134 by respectively aligning the alignment grooves 64 of the plug-like optical connector with the alignment ridges 130 that protrude into the receptacle cavity and then moving the plug-like optical connector 50 into the cavity. This movement is contained so that the receptacle-like optical connector 132 is fully mated to a plug-like optical connector 50, which results in the optical end faces 60 of those two connectors being aligned and abutting within the alignment receptacle 118 (FIGS. 8 and 9). The desired alignment and abutment between the two opposite optical end faces 60 is schematically illustrated in FIG. 10. In accordance with one embodiment of the present invention, the abutting of the optical end faces 60 is further facilitated through the use of one or more latches and a biasing member, such as a spring, that urges one of the optical end faces 60 toward the other optical end face 60. For example, in accordance with one embodiment of the present invention, the referenced latching and biasing features are facilitated by incorporating an appropriately sized optical connector 50, which is more specifically a stack of multi-fiber connectors, into the connector housing disclosed in co-pending patent application Ser. No. 09/276,285, entitled "Small Form Factor Multi-Fiber Optical Connectors and Methods for Making Same," filed Mar. 25, 1999, and incorporated herein by reference.

Figure 11:
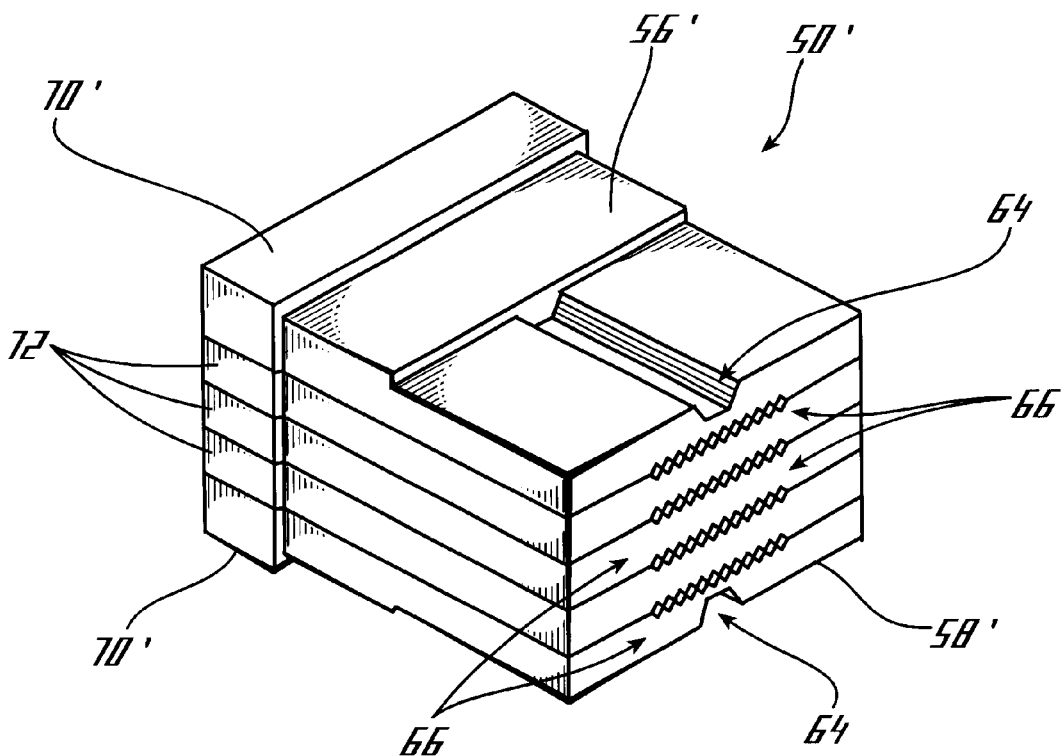
FIG. 11 is a perspective view of a plug-like optical connector, which is in the form of a stack of multi-fiber connectors, in accordance with a second embodiment of the present invention.
Figure 12:
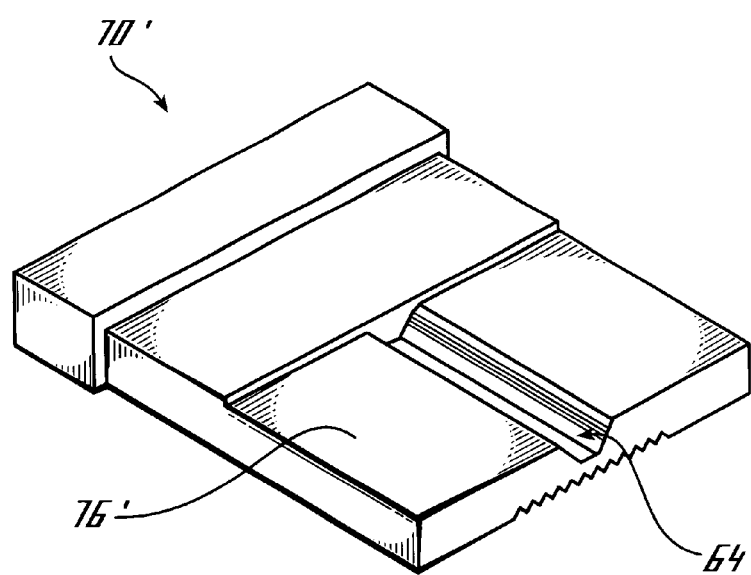
FIG. 12 is an isolated perspective view of an outside surface of an outer support member of the stack of multi-fiber connectors of FIG. 11.
Figure 13:
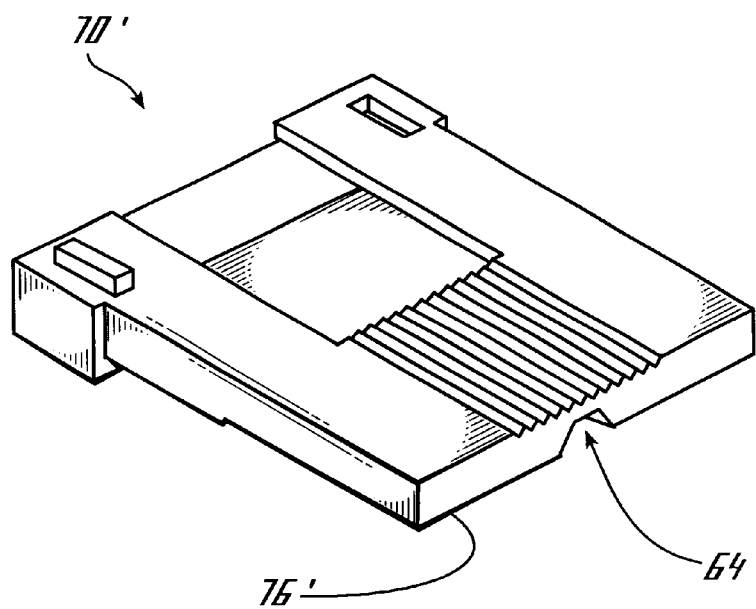
FIG. 13 is an isolated perspective view of an inside surface of the outer support member of FIG. 12.
Figure 14:
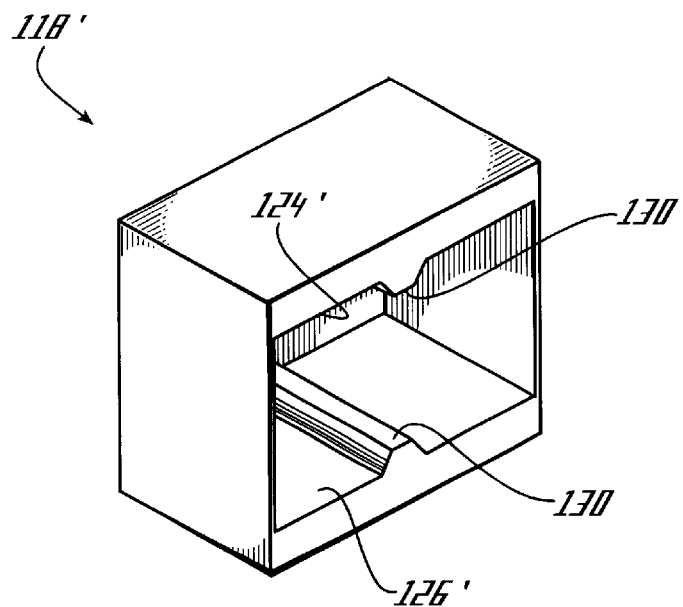
FIG. 14 is an isolated perspective view of an alignment receptacle in accordance with another embodiment of the connector of the present invention.
Figure 15:
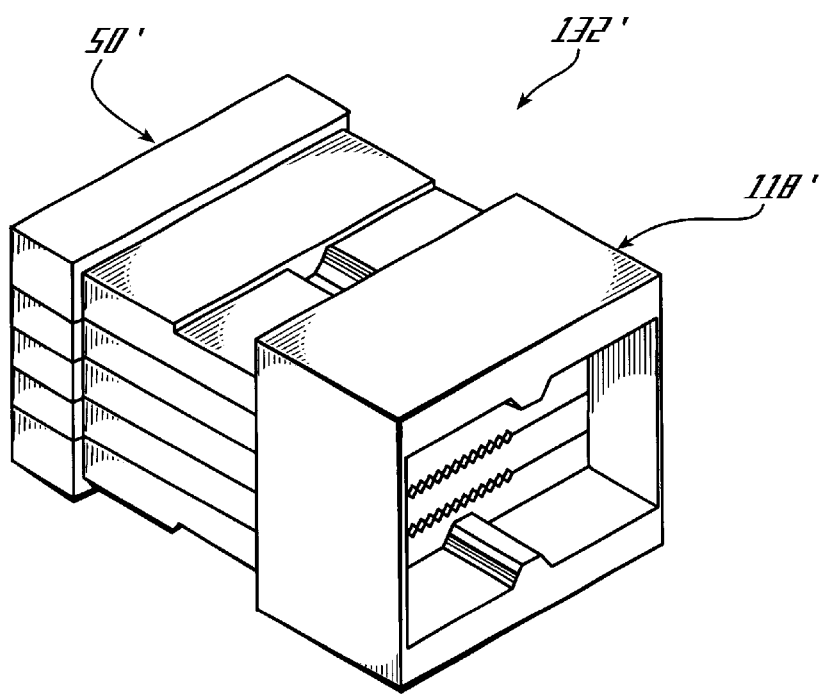
FIG. 15 is a perspective view of a receptacle-like optical connector, which is in the form of the plug-like optical connector of FIG. 11 mated to the alignment receptacle of FIG. 14, in accordance with another embodiment of the connector of the present invention.

FIG. 11 illustrates a plug-like optical connector 50' in accordance with a second embodiment of the connector of the present invention. The optical connector 50' of the second embodiment is substantially similar to the optical connector 50 (FIG. 3) of the first embodiment except for variations noted. In accordance with the second embodiment, the top side 56' of the optical connector 50' includes a single alignment groove 64 that is centered on the top side 56'. Similarly, the bottom side 58' of the optical connector 50' includes a single alignment groove 64 that is centered on the bottom side 58'. More specifically, and as illustrated in FIGS. 12 and 13, each of the outer support members 70' of the optical connector 50' includes a single centered alignment groove 64 on the outside surface 76' thereof. FIG. 14 illustrates an alignment receptacle 118' in accordance with the second embodiment of the present invention. The alignment receptacle 118' of the connector second embodiment is substantially similar to the alignment receptacle 118 (FIG. 8) of the first embodiment, except for noted variations. In accordance with this second embodiment, the alignment receptacle 118' includes a single alignment ridge 130 positioned at the interior top side 124' and centered with respect to the interior top side 124'. Similarly, the alignment receptacle 118' includes a single alignment ridge 130 upon the interior bottom side 126' and centered with respect to the bottom side 126'. FIG. 15 illustrates the plug-like optical connector 50' mated to the alignment receptacle 118', in accordance with the second embodiment of the present invention. The combination illustrated in FIG. 15 can be characterized as a receptacle-like optical connector 132'.

In yet another embodiment, the optical harness 10 can also comprise an optical array connector taught in U.S. Pat. No. 5,214,730, the disclosure of which is herein incorporated by reference, or any other connector suitable for communicating with elements between which the communication is desired.

In a preferred method of assembly, M number of fiber optic row cables are provided. Each of the fiber optic row cables can be connectorized at only one end. Each of the fiber optic row cables comprises an array of N number of optical fibers. Preferably each of the N number of optical fibers is marked with a different color, or other suitable marking, and arranged in the same order within each of the cables. The cables are stacked one on top of each other such that corresponding colors (or other marking) of fibers are disposed on top of each other in a column and such that all of the connectorized ends are on the same side of the stack. For the sake of uniformity, the M number of fiber optic row cables can be cut from the same reel of ribbon cable. The stack of fiber optic row cables can be secured in this configuration preferably intermediate the connectorized ends and the non-connectorized ends. The non-connectorized end is preferably cut at an oblique angle such that the fibers at one end and marked of a like color or other marking, such as the blue marked fibers B, are longer than the fibers disposed beside them, such as the red marked fibers R, in the fiber optic row cable configuration. The columns of like colored fibers can then be separated from their original respective row configurations and re-ribbonized into like marked fiber optic column cables. To facilitate separation of the fibers from the ribbonized row configurations, the harness 10 can be turned such that the columns of like colored fibers are flush with a flat surface, such as a table top. Secondary markings on the fibers can help when re-grouping to keep the fibers in proper order.

An optical connector 50, as disclosed herein, can be fixed to opposing ends of the optical harness by seating fibers of each respective ribbon cable in grooves 82 disposed in support members 70 and 72. A connection between elements (not shown) between which communication is desired through the optical harness 10 can be established with an alignment receptacle 118, 118', as described above.

Although an optical harness and optical cross-connect providing a perfect shuffle is disclosed herein in detail, one with ordinary skill in the art will appreciate that the present invention can include other specific optical cross-connects. It should further be noted that while in some optical cross-connects the number N and number M may differ; in several other cases the number N and number M may be the same. It is intended that all such variations be within the scope of the present invention.

Many variations and modifications may be made to the above-described embodiment(s) of the invention without departing substantially from the spirit and principles of the invention. All such modifications and variations are intended to be included herein within the scope of the present invention.

Therefore, having thus discussed the invention, at least the following is claimed:

1. An optical harness having a first portion and a second portion, said optical harness comprising:

a number M of fiber optic row cables, each of said fiber optic row cables comprising an array of a number N of fibers arranged on a first plane, said fiber optic row cables being disposed toward said first portion of said optical harness, said first plane of each fiber optic row cable being substantially parallel to each other first plane;

a number N of fiber optic column cables, each of said fiber optic column cables comprising an array of a number M of fiber optics arranged on a second plane, said fiber optic column cables being disposed toward said second portion of said optical harness, said second plane of each fiber optic column cable being substantially parallel to each other second plane;

a holding mechanism disposed intermediate said first portion and said second portion of said optical harness; and a high-density connector for receiving ends of at least some of said optical fibers;

wherein said first plane is oriented at a defined angle relative to said second plane and said holding mechanism is arranged and configured to transition said fiber optics from said first portion to said second portion and to maintain said orientation.

2. The optical harness of claim 1, wherein said high-density connector further comprises:

a pair of outer support member, wherein each outer support member comprises opposite and inner sides, the inner side of each outer support member defines an array of parallel grooves for receiving some of the optical fibers, and the outer side of each outer support member defines at least one alignment grooves; and an inner support member comprising opposite first and second sides, wherein the first side defines an array of parallel grooves for receiving some of the optical fibers and the second side defines an array of parallel grooves for receiving some of the optical fibers, and wherein the outer and inner support members are arranged in a stack characterized by the inner support member being positioned between the inner sides of the outer support members.

3. The connector of claim 1, wherein the outer side of each outer support member further defines a second alignment groove, and adjacent alignment grooves are further apart than adjacent grooves of the arrays of parallel grooves.

4. The connector of claim 1, wherein each alignment grooves are substantially parallel to the parallel grooves.

5. The connector of claim 1, further comprising a plurality of inner support member, wherein each inner support member comprises opposite first and second sides, for each inner support member the first side thereof defines an array of parallel grooves for receiving some of the optical fibers and the second side defines an array of parallel grooves for receiving some of the optical fibers and the inner and outer support member are arranged in a stack characterized by the inner support members being positioned between the inner sides of the outer support members.

6. The optical harness of claim 1, wherein said N number of fiber optics comprising each of said M number of fiber optic row cables is reconfigured to provide an optical cross-connect.

7. The optical harness of claim 6, wherein said optical cross-connect comprises a perfect shuffle.

8. The optical harness of claim 1, wherein each of said N number of fiber optics in each of said fiber optic row cables is re-routed to a different of said N number of fiber optic column cables.

9. The optical harness of claim 1, wherein each of said fiber optic column cables is ribbonized.

10. The optical harness of claim 9, wherein said high-density connector is arranged and configured to receive each of said fiber optic column cables.

11. The optical harness of claim 1, wherein each of said fiber optic row cables is ribbonized.

12. The optical harness of claim 11, wherein said high-density connector is arranged and configured to receive each of said fiber optic column cables.

13. A method for cross-connecting between a first element and a second element, said method comprising the steps of:

providing a number M of fiber optic row cables having a first end and a second end, each of said fiber optic row cables having a number N of fiber optics arranged on a first plane;

connectorizing said first end of each of said number M of fiber optic row cables;

stacking said number M of fiber optic row cables such that said connectorized ends of said fiber optic row cables are grouped together;

fixing said stack of fiber optic row cables together;

separating said number N of fiber optics in each of said number M of fiber optic row cables;

grouping said number N of fiber optics into number N of fiber optic column cables each comprising number M of fiber optics, said fiber optic column cables being arranged on a second plane, wherein said second plane is arranged at a predetermined angle with respect to said first plane;

connectorizing said second end;

connecting said first end to said first element; and connecting said second end to said second element.

14. The method of claim 13, wherein said defined angle is substantially ninety degrees.

15. The method of claim 13, wherein said cross-connecting comprises a perfect shuffle.

* * * * *